United States Patent [19]

Ogawa et al.

[11] Patent Number: 4,989,451

[45] Date of Patent: Feb. 5, 1991

[54] THROTTLE VALVE POSITION SENSOR

[75] Inventors: Masaki Ogawa; Yoshiaki Kato, both of Aichi, Japan

[73] Assignee: Toyota Jidosha Kabushiki Kaisha, Toyota, Japan

[21] Appl. No.: 458,782

[22] Filed: Dec. 29, 1989

[30] Foreign Application Priority Data

Jan. 5, 1989 [JP] Japan .................................. 64-42[U]
Aug. 28, 1989 [JP] Japan .............................. 1-99034[U]

[51] Int. Cl.⁵ ........................................... G01M 15/00
[52] U.S. Cl. ................................................ 73/118.1
[58] Field of Search ....................... 73/118.1; 324/538; 340/652; 200/81.9 R, 61.89, 27 A, 30 R, 30 A, 31 R, 31 A

[56] References Cited

U.S. PATENT DOCUMENTS 3,206,667 9/1965 Haase ................................ 200/31 R
3,891,279 6/1975 Frait ..................................... 340/652
4,668,944 5/1987 Teass, Jr. ............................. 340/652
4,715,220 12/1987 Eitoku et al. ....................... 73/118.1
4,866,981 9/1989 Matsumoto et al. ............... 73/118.1

FOREIGN PATENT DOCUMENTS 0024647 2/1980 Japan ................................. 324/538
58-27814 2/1983 Japan .
62-55443 3/1987 Japan .
62-168953 7/1987 Japan .
63-28853 2/1988 Japan .

*Primary Examiner*—Robert Raevis
*Attorney, Agent, or Firm*—Kenyon & Kenyon

[57] ABSTRACT

A throttle valve sensor having at least two switches for detecting different positions of a throttle valve. The setting of the switching conditions of the switches is such that these switches can not be made OFF simultaneously, over the entire range of the degree of opening of the throttle valve. A detachment of a connector connecting the sensor to a control circuit causes the corresponding port voltage level to be that obtained when all of the switches are made OFF, and as a result, a quick and positive detection of a detachment of the connector can be obtained.

9 Claims, 10 Drawing Sheets

THROTTLE VALVE POSITION SENSOR

BACKGROUND OF THE INVENTION

1. Field of the Invention

The present invention relates to a throttle valve position sensor used as an electronic control device for an internal combustion engine, and in particular, to such a throttle valve position sensor provided with a plurality of switches for detecting different positions of the throttle valve.

2. Description of the Related Art

In an electronically controlled internal combustion engine for a vehicle, usually a throttle valve position sensor is used for detecting different positions of the throttle valve as a parameter of the engine operating condition. For this purpose, a conventional throttle valve position sensor is provided with a plurality of pairs of contacts (switches) which are made ON or OFF in accordance with different angular positions of the throttle valve, whereby it is possible to determine whether or not the throttle valve is actually in a designated position.

Usually, the computer controlled electronic engine control system is provided with a fail-safe function which determines whether or not the engine is operating properly, and warns the driver of any malfunction. The fail-safe system for the throttle position sensor is usually a means provided for determining whether a connector coupling the throttle position sensor to a microcomputer as a control circuit has been accidentally detached. Further, for the detection by the throttle position sensor of an idle position of a throttle valve of an internal combustion engine, while the engine is operating, a fail-safe system has been proposed wherein a counter is incremented every time the engine is started, and is cleared every time a signal from the idle switch is received. (see Japanese Unexamined Pat. Publication No. 63-28853). It is considered that, during a normal running of the engine, the throttle valve will be in the idling position at least once, and therefore, a zero value will be obtained at the counter when the engine is started, if the idle switch is operating properly. Accordingly, it is determined that a malfunction exists when the value of the counter is larger than a predetermined value. Namely, when the connecter to the idle switch is detached, a signal is not received from the idle switch, and accordingly, the counter is not cleared, whereby it is determined that a malfunction has occurred.

This prior art suffers from a drawback in that a certain amount of time must pass before the malfunction (detachment of the connector) is detected, since the present number of the counter cannot be obtained until after a repetition of a certain number of starting and stopping cycles of the engine, after the detachment of the connector. This problem becomes more serious when the prior art fail-safe technique is applied to the detection of the position of a switch denoting a position of the throttle valve, such as a fully-open position, which has a greater degree of opening than the idling position. This fully-open position switch is not always operated during a period from a starting of the engine to a stopping of the engine, and therefore, the counter maintains a cleared condition, and thus the detection of a malfunction is not possible.

SUMMARY OF THE INVENTION

An object of the invention is to provide a throttle valve position sensor provided with a plurality of switches which can quickly and correctly detect a malfunction of the sensor, such as a detachment of the connector thereof.

According to the present invention, a throttle valve sensor is provided for detecting at least two different angular positions of a throttle valve of a internal combustion engine for an automobile. The sensor comprises:

at least two switches each having an ON state and ,an OFF state, and;

a drive, responsive to movements of the throttle valve, for operating said at least two switches so that the states of said at least two switches are changed between the ON state and the OFF state at respective different positions of the throttle valve;

the states of said at least two switches being set in such a manner that an OFF condition of said at least two switches cannot occur simultaneously, over the entire range of movement of the throttle valve.

BRIEF EXPLANATION OF THE DRAWINGS

FIG. 4 (*b*) shows the conditions of switch ports of a control circuit in accordance with the degree of opening of the throttle valve when the switch conditions are as shown in FIG. 4 (*a*);

FIG. 6 (*b*) shows the conditions of switch ports of a control circuit in accordance with the degree of opening of the throttle valve when the switch conditions are as shown in FIG. 6 (*a*);

DESCRIPTION OF THE PREFERRED EMBODIMENTS

Figure 1:
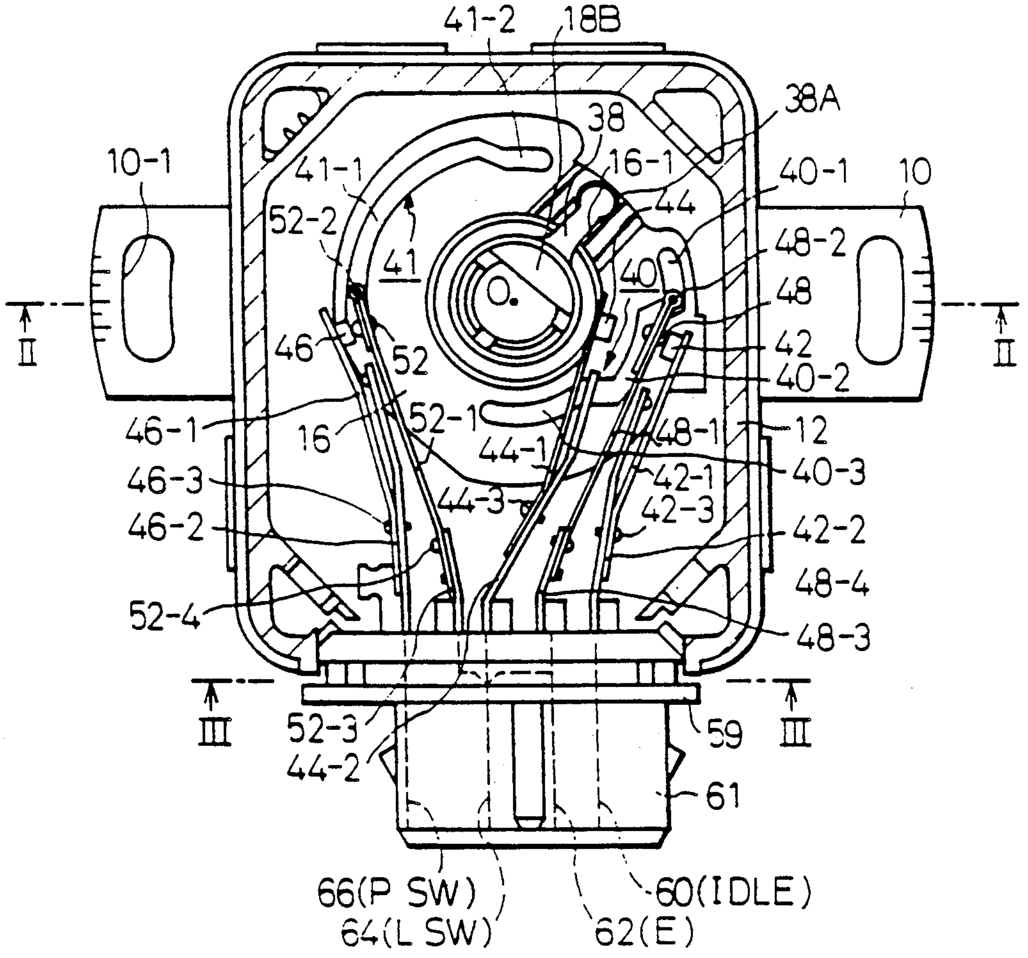
FIG. 1 shows an upper elevational view of a throttle valve position sensor according to the present invention, with the cover thereof removed.
Figure 2:
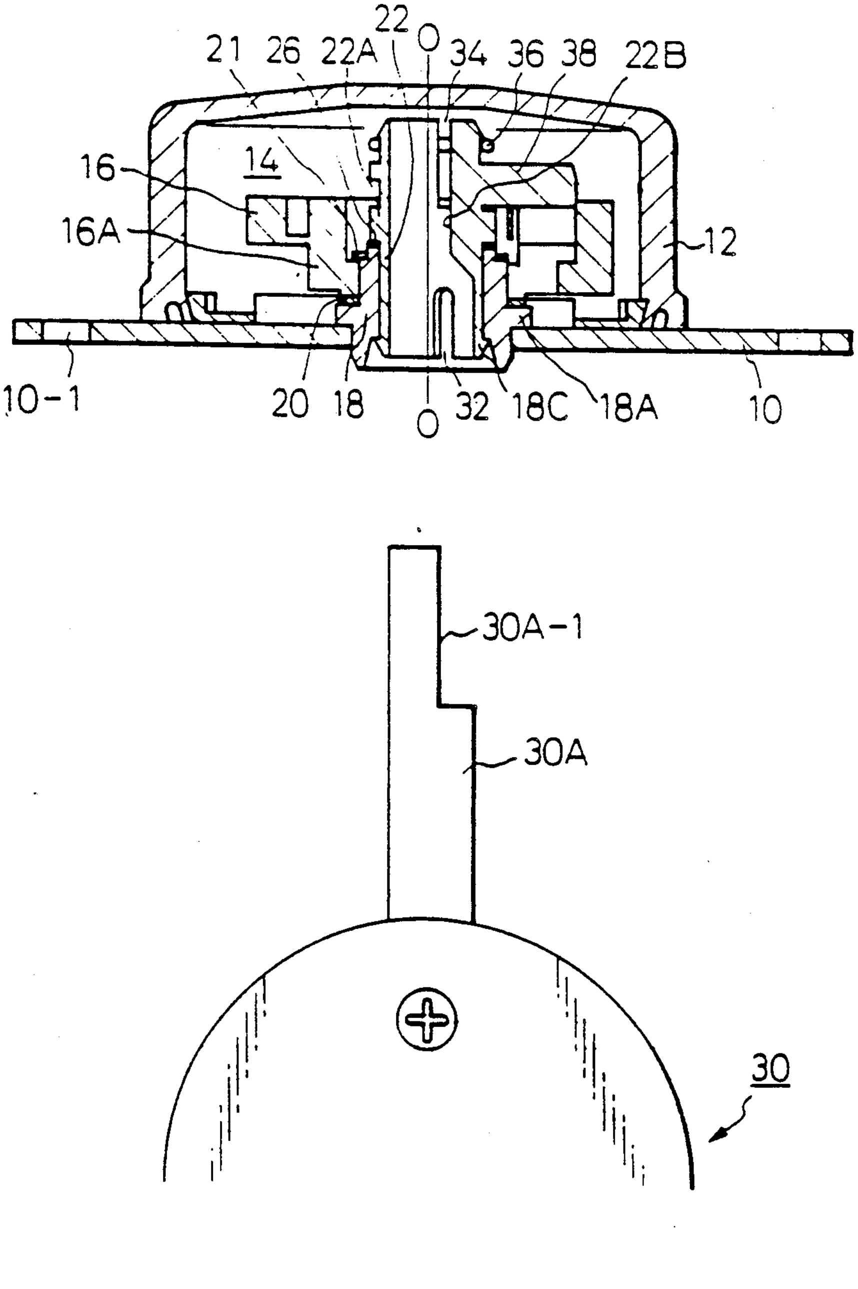
FIG. 2 is a cross sectional view taken along the line II—II in FIG. 2.
Figure 3:
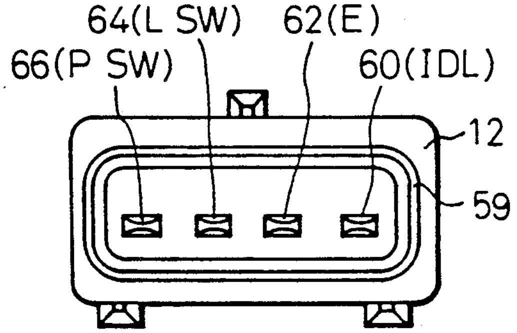
FIG. 3 is a cross sectional view taken along the line III—III in FIG. 3.

Embodiments of the throttle valve position sensor according to the present invention, used for detecting the position of a throttle valve of an internal combustion engine, will be described. In FIGS. 1, 2, and 3 , 10 denotes a base plate to which a switch cover 12 is fixed, so that a space 14 is formed therebetween in which a rotor 16 is arranged. The rotor 16 comprises a hub portion 16A in which a sleeve 18 is rotatably inserted. The sleeve 18 is provided with a bottom flanged end 18A fixedly mounted in the base plate 10, and an upper free end. The bottom end of the sleeve 18 is fixed to the base plate 10 by the flange portion 18A thereof. As shown in FIG. 1, the base plate 10 has arc-shaped openings 10-1, formed at each end thereof, to which bolts (not shown) are inserted for fixing the plate 10 to an intake pipe of an internal combustion engine. A washer 20 is arranged between the facing end surfaces of the flange portion 18A and the rotor 16, a snap ring 21 is arranged on the sleeve 18, to be in contact with the side of the ring 16 opposite the flange 18A, and a bush 22 is rotatably fitted to the sleeve 18. The bush 22 forms an annular projection having an end surface thereof in contact with the end surface of the sleeve 18, via a washer 26. In FIG. 2, 30 denotes a throttle valve assembly which includes a butterfly valve member and a shaft 30A extending therefrom and inserted into the bush 22. The throttle shaft 30A has a flattened recess portion 30A-1, which engages with a flattened projection 22B formed in the inner surface of the bush 22, so that rotation of the throttle shaft 30A caused by movement of an accelerator pedal (not shown) is transmitted directly to the bush 22. The bottom end of the bush 22 is provided with slitted portions 32, which generate a resilient force urging the bush 22 toward the inner surface of the sleeve 18, to ensure a firm engagement between the bush 22 and the sleeve 18. The slits in the bottom end of the bush 22 define radially outwardly projected notches 18C, which engage the outer end of the sleeve 18 so that the bush 22 cannot be detached therefrom. The upper end of the bush 18 is provided with similar slits 34, and a tightening ring 36 is arranged around the slits 34 and generates a radially inwardly directed force for holding the shaft 30A when inserted therein, so that a firm connection of the shaft 30A to the sleeve 22 is obtained. An arm portion 38 is integrally and radially extended from the outer surface of the sleeve 22, and is provided at the free end thereof with a contacting portion 38A which is extended to engage with a radial slit 16-1 formed on the rotor 16, to be thereby radially extended from the center C of the rotor 16. Therefore, when the sleeve 18 is rotated by the rotation of the throttle valve shaft 30A, the rotor 16 is rotated in the same direction due to the engagement of the end 38A of the arm portion with the groove 16-1 on the rotor 16. The rotor 16 is provided therein with a pair of angularly spaced angular cam grooves 40 and 41. The first cam groove 40 is constructed by a first portion 40-1, a second portion 40-2 and a third portion 40-3, which are circumferentially spaced in that order along the direction of the rotation of the rotor 16. The radius of the portion 40-1 is larger than that of the portion 40-2 and the radius of the portion 40-2 is larger than that of the portion 40-3. The second cam groove 41 is constructed by a first portion 41-1 and a second portion 40-2, which are circumferentially spaced in that order along the direction of the rotation of the rotor 16. The radius of the portion 41-1 is larger than that of the portion 41-2.

The sensor of the first embodiment is provided with three sets of contacts; i.e., an idle contact 42, a lean contact 44, and a power contact 46. The idle contact 42 is provided on one end of a contact lever 42-1 made of a resilient metal strip member, and the other end of the contact lever 42-1 is fixedly connected to a supporting plate 42-2 by a rivet 42-3. The lean contact 44 has substantially the same construction, and is provided on one end of a contact lever 44-1 made of a resilient metal strip member, and the other end of the contact lever 44-1 is fixedly connected to a supporting plate 44-2 by a rivet 44-3. A first switching contact 48 is arranged between the idle contact 42 and the lean contact 44, and on one end of a switching-driving lever 48-1. The other end of the lever 48-1 is fixedly connected to a support plate 48-3 by a rivet 48-4. A pin 48-2, as a cam follower, is mounted on the switching lever 48-1 at a position adjacent to the switching contact 48, and is engaged in the first cam groove 40 of the rotor 16, to permit the switching lever 48-1 to realize a switching function in accordance with a rotation of the rotor 16, as will be fully described later. The power contact 46 has substantially the same construction as that of the contact 42 and 44, and is provided on one end of a contact lever 46-1 made of a resilient metal strip member. The other end of the contact lever 46-1 is fixedly connected to a supporting plate 46-2 by a rivet 46-3. A second switching contact 52 is arranged adjacent to the power contact 46, which is arranged on one end of a switching-driving lever 52-1. The other end of the lever 52-1 is fixedly connected to a support plate 52-3 by a rivet 52-4. A pin 52-2, as a cam follower, is mounted on the switching lever 52-1 at position adjacent to the switching contact 52, and is engaged in the second cam groove 41 of the rotor 16 to permit the switching lever 52-1 to realize a switching function in accordance with a rotation of the rotor 16, as will be fully described later.

Numeral 61 denotes a connector portion comprised of lead members 60, 62, 64, and 66, which construct an idle switch terminal IDL, a ground terminal E, a lean switch terminal LSW, and a power switch terminal PSW, respectively. The idle switch terminal 60 (IDL) is electrically connected to the idle contact 42, the ground terminal 62 (E) is electrically connected to the first and second switching contacts 48 and 52, the lean switch terminal 64 (LSW) is electrically connected to the lean contact 44, and the power switch terminal 66 (PSW) is electrically connected to the power terminal 46. The terminals 60, 62, 64, and 66 of the connector portion 61 are connected, via a connector (not shown), to a control circuit as a microcomputer unit for controlling the operation of an internal combustion engine.

Figures 4A, 4B:
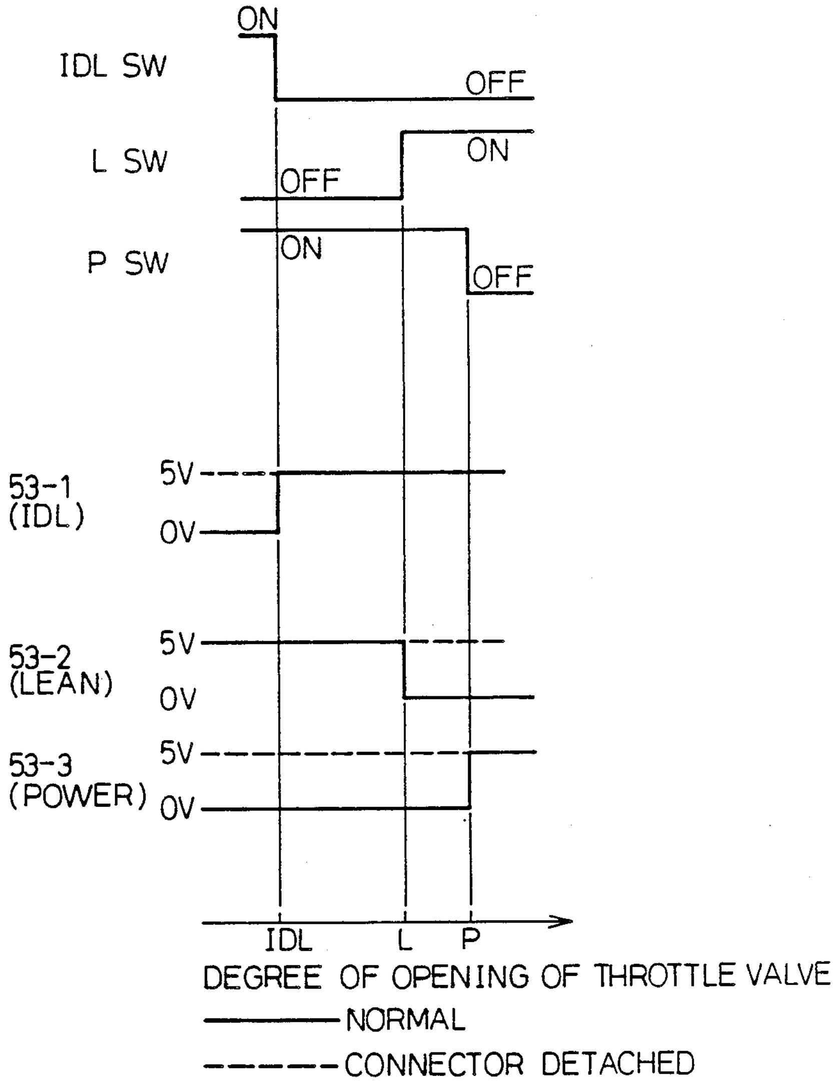
FIG. 4 (*a*) shows the conditions of the switches in the throttle valve sensor in accordance with the position of the throttle valve according to the present invention.

FIG. 4(*a*) shows the conditions of the switches of the throttle valve position sensor of the first embodiment of the present invention, in accordance with the position of the throttle valve. First, when the throttle valve is in the idle position (Idle), the idle switch IDLSW is in the ON position, the lean switch LSW is in the OFF position, and the power switch PSW is in the ON position. In this state wherein the throttle valve is in the idle position, the switching member 48-2 of the first switching contact 48 is located in the radially outermost first portion 40-1 of the first cam groove 40, so that the switching contact 48 is in contact with the idle contact 42, causing the idle switch IDLSW to be made ON. The switching contact 48 is separated from the lean contact 44, and thus the lean switch LSW is made OFF. Finally, in this idle condition, the switching member 52-2 of the second switching contact 52 is located in the radially outer portion 41-1 of the second cam groove 41, so that the switching contact 52 is urged into contact with the power contact 46, and thus the power switch PSW is made ON.

When the throttle valve is rotated from the idling position IDL by rotating the rotor 16 in the counter-clockwise direction in FIG. 1, the position of the switching member 48-2 in the cam groove 40 is moved from the outer portion 40-1 to the intermediate groove portion 40-2, whereby the switching contact 48 is separated from the idle contact 42, and thus the idling switch IDLSW is made OFF.

Nevertheless, the position of the switching contact 48 apart from the lean contact 44 is maintained, to keep the lean switch LSW in the OFF position, due to the angular location of the cam plate 16, i.e., the degree of opening of the throttle valve. Furthermore, at this degree of opening of the throttle valve, the second switching member 52-2 is still in the outermost portion 41-1 of the cam groove 41, and therefore, the switching contact 52 is still in contact with the power contact 46, and thus the power switch PSW is still in the ON position.

When the throttle valve is opened to a predetermined degree of opening L corresponding to, for example, a 50 percent opening of the full of degree of opening of the throttle valve, the position of the first switching member 48-2 in the first cam groove 40 is moved from the intermediate radius portion 40-2 to the innermost radius portion 40-3, which brings the switching contact 48 into contact with the lean contact 44, and thus the lean switch LSW is made ON. The switching contact 48 is, of course, still separated from the idle contact 42, to maintain the idle switch IDLSW in the OFF state. Furthermore, at this degree of opening of the throttle valve, the second switching member 52-2 is still in the outer portion 41-1 of the cam groove 41, and therefore, the switching contact 52 is still in contact with the power contact 46, and thus the power switch PSW remains ON.

When the throttle valve is opened to a fully opened position (P), the position of first switching member 48-2 in the innermost portion 40-3 of the first cam groove 40 is unchanged, and accordingly, the first switching contact 48 is still in contact with the lean contact 44, whereby the ON state of the lean switch LSW and the OFF state of the idle switch IDLSW are maintained. Contrary to this, the position of the second switching member 52-2 in the second cam groove 41 is moved from the outer radius position 41-1 to the inner radius position 41-2, whereby the second switching member 52-2 is separated from the power contact 46, and thus the power switch PSW is made OFF.

The constructional feature of the throttle position sensor in this first embodiment lies in the relationship of the states (ON or OFF position) of the idle switch IDLSW, the lean switch LSW, and the power switch PSW, which are such that all three switches cannot be made OFF at the same time. As will be fully explained later, a change of voltage level at each of the ports of a control circuit connected to each respective switch will occur between the ON and OFF states thereof, and therefore, a detection of such a change in the voltage level enables a determination of the position of the switch, i.e., the specified degree of opening of the throttle valve. When the connector is detached, the ports will be at a voltage level corresponding to the OFF states thereof, which can not occur if the sensor is operating normally, and thus it is possible to detect an abnormal condition of the sensor.

Figure 5:
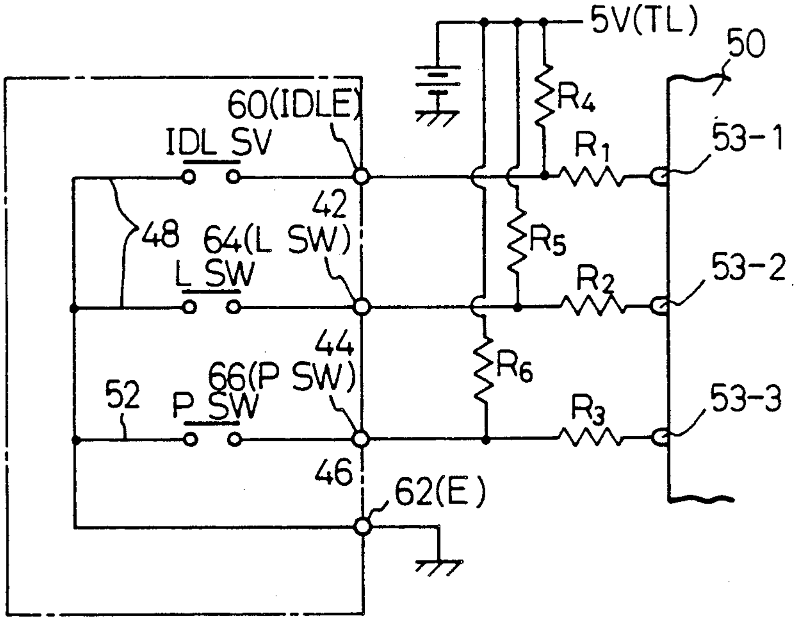
FIG. 5 shows the connections of the switches of the throttle valve sensor to the corresponding switch ports of the control circuit.
Figures 6A, 6B:
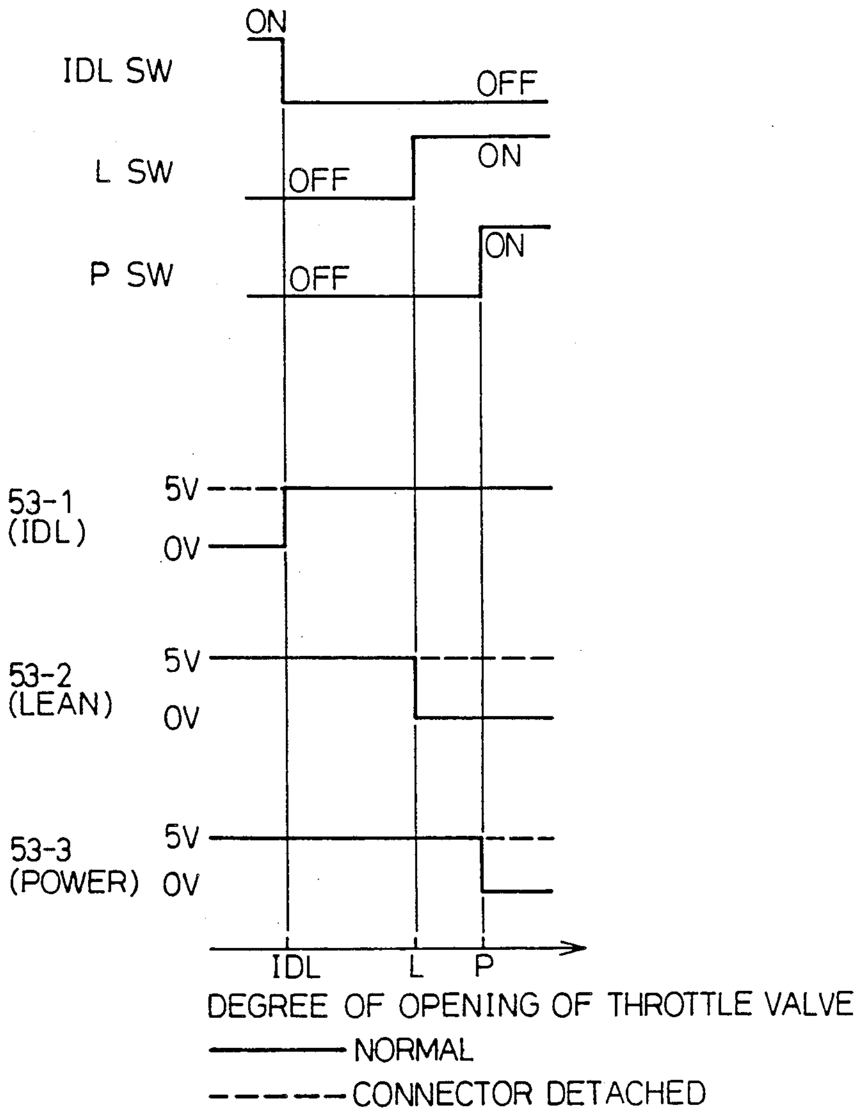
Fig.6a PRIOR ART
Fig.6b PRIOR ART
FIG. 6 (*a*) shows the conditions of the switches in the throttle valve sensor in accordance with the positions of the throttle valve when arranged in a manner different to that of the present invention.

The method of detecting a malfunction will be now described in more detail. FIG. 5 illustrates the connection of the idle switch IDLSW, the lean switch LSW, and the power switch PSW. The control circuit 50 is provided with an idle switch port 53-1, a lean switch port 53-2, and a power switch port 53-3, which are connected to the idle switch terminal 60 (IDL), the lean switch terminal 64 (LSW) and the power switch terminal 66 (PSW) via resistors $R_1$, $R_2$ and $R_3$, respectively. As already explained, the idle switch IDLSW is constructed by the idle contact 42 and the first switching contact 48, the lean switch LSW is constructed by the lean contact 44 and the first switching contact 48, and the power switch PSW is constructed by the power contact 46 and the second switching contact 52. The earth terminal 62 (E) grounds the first and second switching contacts 48 and 52 in the control circuit 50. The electric voltage source of 5V connected to portions between the resistor $R_1$ and the terminal 60, between the resistor $R_2$ and the terminal 64, and between the resistor $R_3$ and the terminal 66, via the resistors $R_4$, $R_5$ and $R_6$, respectively. When one switch, for example, the idle switch IDLSW, is made ON, the voltage level of the corresponding port 53-1 will be zero volt (Low), and when the idle switch IDLSW is made OFF, the voltage level of the port will be 5 volt (High). The control circuit requires this setting of the state of the switches wherein the OFF position of any one of the switches causes the voltage at the corresponding switch port of the control circuit to become high. Nevertheless, the reverse setting can be employed wherein the OFF, position of any one of the switches causes the voltage at the corresponding switch port of the control circuit to become low. In any case, the states of the switch ports show the conditions of the corresponding switches, which shows the degree of the opening of the throttle valve. Namely, it is possible to determine a position of the throttle valve from the state of any one of the switch ports. FIG. 4 (*b*) shows the states of the idle switch ports 53-1, the lean switch port 53-2, and the power switch port 53-2 when the positions of the corresponding switches are as shown in FIG. 4 (*a*). According to this embodiment, the setting of the idle switch IDLSW, the lean switch LSW, and the power switch PSW are such that they can not be made OFF simultaneously over the entire range of the degree of the opening of the throttle valve. Therefore, as long as the switches are operating correctly, the switch ports 53-1, 53-2 and 53-3 cannot have a high voltage simultaneously, regardless of the degree of the opening of the throttle valve (IDL, L and M). If, however, a connector is accidentally detached, the voltage of all of the switch ports 53-1, 53-2 and 53-3 will become high (5V), and accordingly, it can be seen that there is a malfunction in the throttle position sensor, since it is impossible for all of the switches ports to be at a high voltage as long as the switches are operating properly. This embodiment permits the detection of a malfunction of the sensor by arranging the states of the switches as shown by FIG. 4 (*a*). Conversely, it is impossible to detect such a malfunction if the switch states are determined as shown in FIG. 6 (*a*) in accordance with the prior art. In this prior art in FIG. 6 (*a*), in comparison with the arrangement of this invention in FIG. 4 (*a*), the arrangement of the power switch PSW is reversed, so that the PSW is OFF when the degree of the opening of the throttle valve is lower than P and is ON when the degree of the opening of the throttle valve is higher than P. The state of the switch ports is shown in FIG. 6 (*b*), which corresponds to the arrangement in FIG. 6 (*a*). When the connector is accidentally detached, the voltage level at all of the switch ports 53-1, 53-2 and 53-3 will be high, as shown by dotted lines, and as shown in FIG. 4 (*b*) in accordance with the embodiment of the present invention. Nevertheless, in the arrangement of the prior art shown in FIG. 6 (*b*), there is normal switch state at which all of the voltage levels at the switch ports are lower than 5 volts when the degree of opening of the throttle valve is between IDL and L, which can not be discriminated from a malfunction caused by a detachment of the connector for connecting the throttle position sensor to the control circuit. As a result, in the prior art, a detection of the malfunction caused by a detachment of the connector can not be realized.

Figure 7:
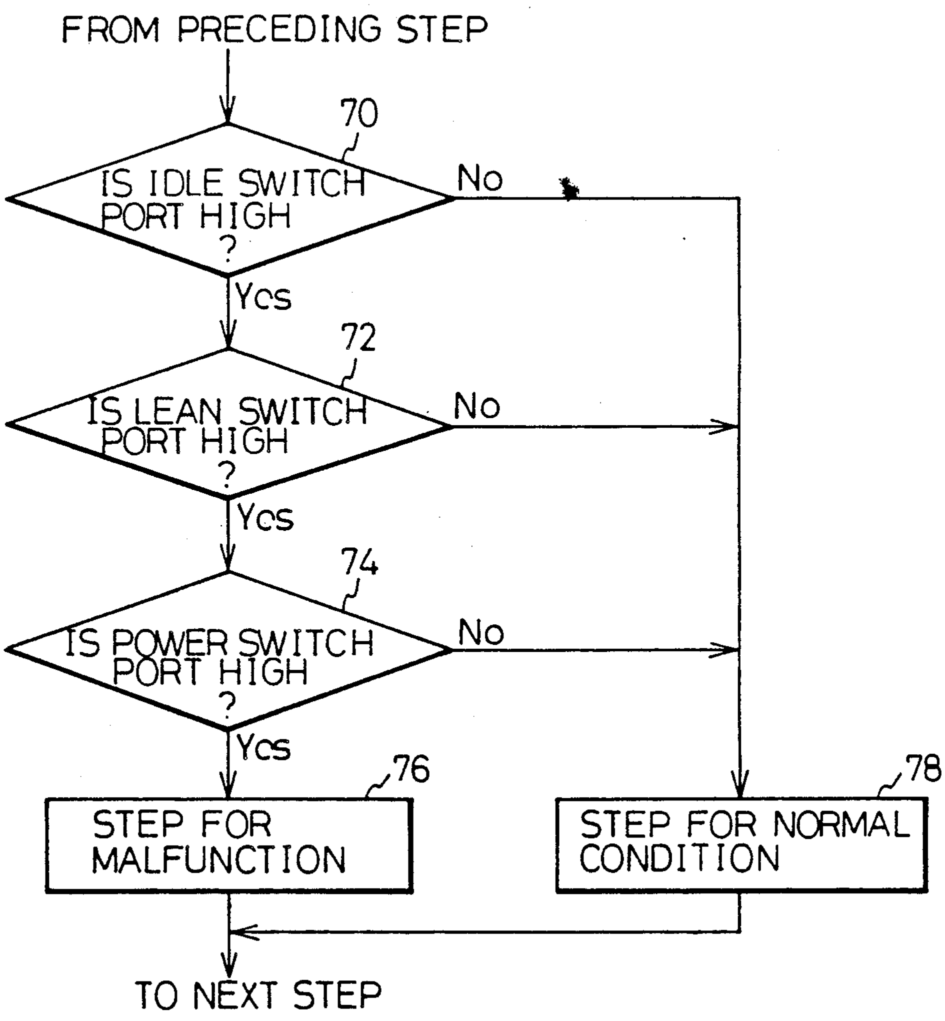
FIG. 7 shows a flowchart for carrying out the detection of a malfunction of the throttle valve sensor according to the present invention.

FIG. 7 shows a portion of a routine carried out in an engine control device for an internal combustion engine. This routine can be included in a main routine. At step 70, it is determined that the voltage level at the lean switch port 53-1 is high, and at step 72, it is determined that the voltage level at the lean switch port 53-2 is high, then at step 74, it is determined if the voltage level at the power switch port 53-3 is high. When the voltage levels at all of the ports 53-1, 53-2, and 53-3 are high, the routine goes to step 76, and a process for indicating a malfunction is carried out. For example, a warning lamp (not shown) is made ON, or a flag indicating a malfunction is written in a nonerasable memory, for future maintenance. When none of the ports 53-1, 53-2 and 53-3 is high, the routine goes to step 78, and an procedure for a normal switch operation is carried out.

Figure 8A:
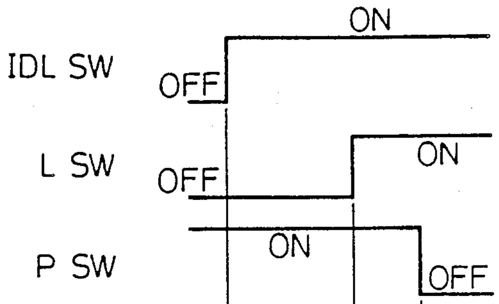
FIG. 8 (*a*) and 8 (*b*) are similar to FIG. 4 (*a*) and 4 (*b*) and show another embodiment of the present invention.
Figure 8B:
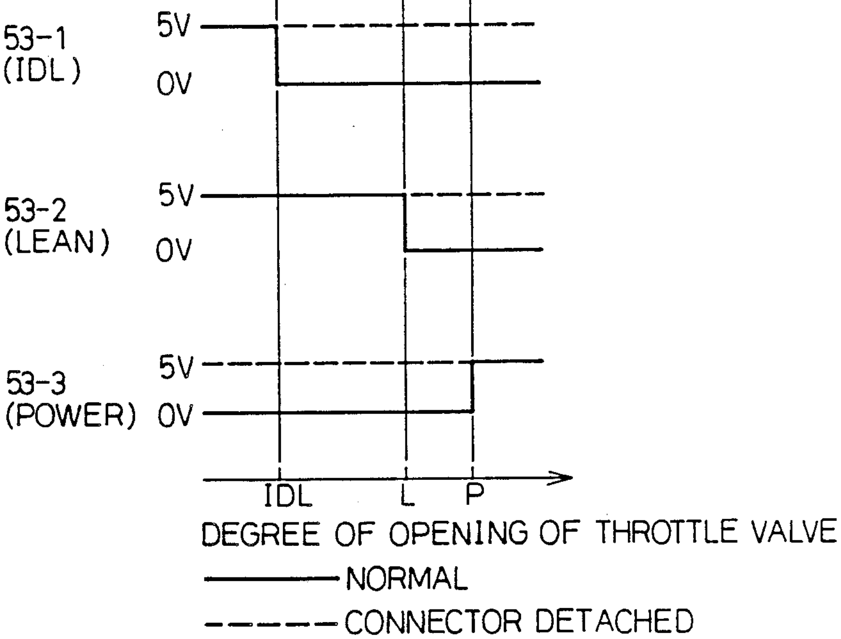

FIG. 8 (*a*) shows a second embodiment of the setting of the three switches IDLSW, LSW, and PSW. This embodiment differs from the first embodiment in FIG. 4 (*a*) in that the idle switch IDLSW is ON when the throttle valve is opened from the idle position IDL. As in the first embodiment, the lean switch LSW is made OFF until the throttle valve is opened to the degree L, and is switched ON when the throttle is opening is larger than L. The power switch PSW is OFF when the degree of the throttle opening of the throttle valve is higher than P. In this embodiment, the setting of the states of the three switches IDLSW, LSW and PSW is such that all thereof can not be made OFF simultaneously, over the entire range of the throttle opening. The voltage conditions of the switch ports 53-1, 53-2, and 53-3 are shown in FIG. 8 (*b*). The voltages at the ports 53-1, 53-2, and 3 do not reach a high level simultaneously, as long as the sensor is operating normally. But when a malfunction, such as a detachment of the connector connecting the sensor with the control circuit occurs, all of the ports 53-1, 53-2 and 53-3 become high, as shown by dotted lines, which occurs only when there is a malfunction in the sensor, and as a result, the malfunction can be detected.

In the embodiment of the switch settings corresponding to FIGS. 8 (*a*) and 8 (*b*), a detachment of only the terminal 60 at the idel switch IDLSW can be detected by determining whether or not both the idle switch port 53-1 and the power switch port 53-3 are high, as the idle switch IDLSW and the power switch PSW can not be made OFF simultaneously; a detachment of only the terminal 64 at the lean switch LSW can be detected by determining whether or not both the lean switch port 53-2 and the power switch port 53-3 are high, as the lean switch LSW and the power switch PSW can not be made off simultaneously; and detachment of only the terminal 66 at the power switch PSW can be detected by determining whether or not both the power switch port 53-3 and the lean switch port 53-2 are high, as the power switch PSW and the leans switch LSW can not be made OFF simultaneously. Alternatively, a detachment of only the terminal 66 at the power switch PSW also can detected by determining whether or not both the power switch port 53-3 and the idle switch port 53-1 are high, as the power switch PSW and the idle switch IDLSW can not be made OFF simultaneously.

Figure 9:
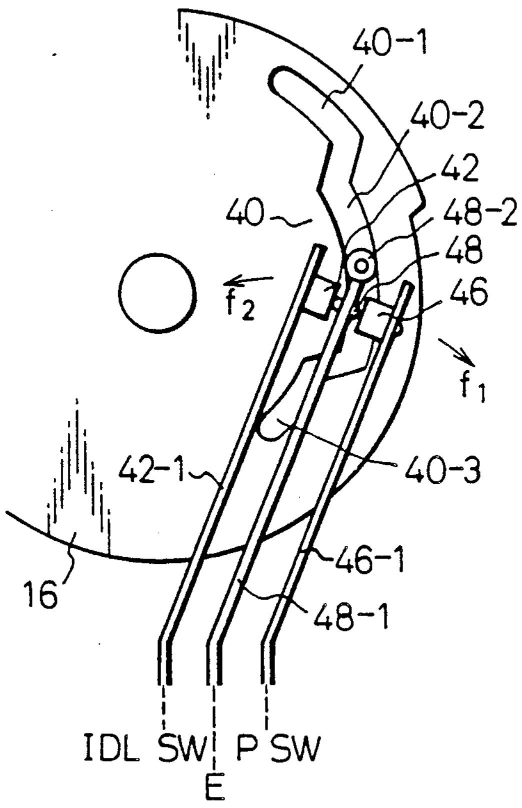
FIG. 9 is an upper schematic elevational view of the throttle valve sensor according to the present invention, when applied to a type having only two switches.

FIG. 9 shows an embodiment of a throttle valve position sensor having only two contacts, i.e., an idle contact 42 and a power contact 46. FIG. 9 shows only the relationship between the contacts 42 and 46 and the rotor 16. The idle contact 42 is extended to the idle switch terminal IDL via a lever 42-1 made of a resilient material, and the power contact 46 is extended to the power switch terminal P via a lever 46-1 made of a resilient material. The switching contact 48 is extended to an earth terminal E via a lever 48-1 made of a resilient material. The rotor 16 defines a cam groove 40 having an outermost maximum radius portion 40-1, an intermediate portion 48-2 having an intermediate radius, and a minimum radius innermost portion 40-3. A pin 48-2 as a cam follower is attached to the free end of the lever 48-1. Further, an idle switch IDL is constructed by the idle contact 42 and the switching contact 48, and a power switch PSW is constructed by the power contact 46 and the switching contact 48.

When the engine is idling, the cam plate 16 is at a position further rotated in the clockwise direction than shown in the drawing, and thus the cam follower pin 48-2 is located in the outermost groove portion 40-1. As a result, the lever 48-1, which maintains the contact between the switching contact 48 and the idle contact 46, is flexed as shown by an arrow f1 in FIG. 9, whereby the switch contact 42 is separated from the power contact 46. As a result, when the throttle valve is and the idle position, the idle switch IDLSW is made OFF and the power switch PSW is. made ON.

When the throttle valve is opened from the idle position, so that the cam plate 16 is rotated to a position IDL at which the cam follower in 48-2 is located in the intermediate groove portion 40-2 as shown in FIG. 9, the lever 48-1, which maintains the contact between the switching contact 48 and the idle contact 46, is flexed as shown by an arrow f2 in FIG. 9, and thus the switching contact 48 is brought into contact with the power contact 42. As a result, when the throttle valve is opened from the idle condition, the idle switch IDLSW is made ON, and power switch PSW is made ON.

When the throttle valve is fully opened, the cam plate 16 is rotated to a position at which the cam follower pin 48-2 is located in the innermost groove portion 40-3 and thus the lever 48-1, which maintains the contact between the switching contact 48 and the idle contact 46, is flexed as shown by an arrow f2 in FIG. 9, whereby the switching contact 48 is separated from the idle contact 46. As a result, when the throttle valve is fully opened, the idle switch IDLSW is made ON, and power switch PSW is made OFF.

Figure 10:
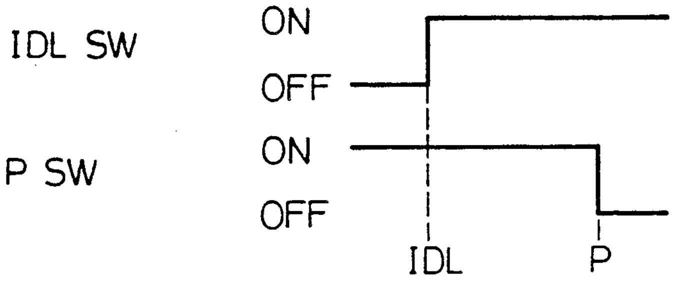
FIG. 10 shows the setting of the switches of the throttle valve sensor in FIG. 9.

In this type of switch, the two switches can not be made OFF simultaneously, regardless of the position of the throttle valve as shown in FIG. 10, and as a result, the detection of the states of the switch ports enables a detection of a detachment of the connector, as in the first embodiment wherein three switches are provided. In other words, as long as the connector is connected, the switch ports of the control unit can not be at a high level simultaneously, but if the connecter is accidentally detached, the voltage level of both ports will become high, and thus a malfunction can be detected.

In this embodiment of FIG. 9, when only the idle terminal is detached, the idle switch port remains at a high voltage level, regardless of the degree of opening of the throttle valve. Accordingly, a situation will occur in which both of the switch ports are at a high level, which can not occur as long as the connecter is connected, and as a result, a detachment of only this terminal can be detected. Similarly, a detachment of the terminal leading to the power switch can be detected.

Figure 11:
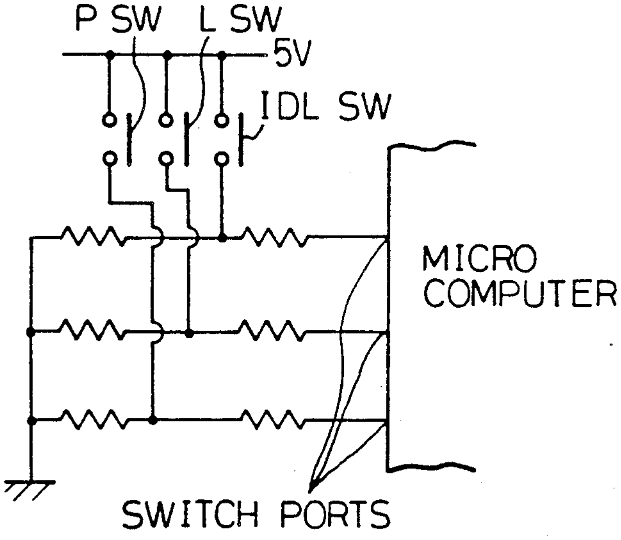
FIG. 11 shows another method of connecting the throttle valve sensor to the sensor ports of the control circuit.

The embodiments explained above are directed to an arrangement whereby the switches IDLSW, LSW and PSW are provided between the corresponding switch ports and ground, which means that the corresponding ports will be at a high voltage level if the corresponding connecter is detached. The switches IDLSW, LSW and PSW, however, can be arranged between the power supply and the corresponding switch ports as shown in FIG. 11. In this arrangement, when the switch is ON, the corresponding switch port can be at high voltage level, and when the switch is OFF, the corresponding switch port can be at a low voltage level. If a connector is detached, all of the switch ports become low level simultaneously, but since the plurality of the switches are arranged such that they can not be made OFF simultaneously, the switch ports do not become low level simultaneously. As a result, a detachment of the connecter can be detected by determining whether all of the switch ports are at a low voltage level simultaneously.

Although the embodiments of the present invention have been described with reference to the attached drawings, many modifications and changes can be made by those skilled in this art without departing from the scope and spirit of the present invention.

We claim:

1. A throttle valve position sensor for detecting at least two different angular positions of a throttle valve of an internal combustion engine for an automobile, said sensors comprising:

at least two switches each having ON and OFF states, each of said at least two switches including a first contact, a first resilient member supporting said first contact, a second contact, and a second resilient member supporting said second contact, said first contact and said second contact forming a switch; and a drive, responsive to movements of the throttle valve, for operating said at least two switches so that states of said at least two switches change between ON and OFF at respective different positions of the throttle valve, said drive cooperating with one of said resilient members to move between a first position at which said first and second contacts are separated and a second position at which said first contact abuts said second contact, the setting of the states of said at least two switches being such that said switches cannot be made OFF simultaneously, over the entire range of movement of the throttle valve.

2. A throttle valve position sensor according to claim 1, wherein said drive comprises a cam plate connected to the throttle valve and having an axis of rotation about which said cam plate is rotated in accordance with a degree of opening of the throttle valve, said cam plate defining at least one cam groove and further comprising a cam follower mounted on said fist resilient member and cooperating with said at least one cam groove, so that said first contact is moved between said first position and said second position in accordance with the rotational movement of plate.

3. A throttle valve position sensor according to claim 2, wherein said resilient members supporting said contacts moved between said first and second positions of said at least two switches comprise a single resilient member.

4. A throttle valve sensor according to claim 2, wherein said at least one cam groove forms a plurality of portions each having a different radius, from the axis of rotation of the cam plate, the radius of said portions being such that a substantially radial movement of said first contact is obtained to thereby realize a desired pattern of the switching of the switch.

5. A throttle valve sensor according to claim 1, wherein said at least two switches consists of two switches.

6. A throttle valve sensor according to claim 1, wherein said at least two switches consists of three switches.

7. A fail-safe system for a throttle valve of an internal combustion engine, said system comprising:

at least two switches each having ON and OFF states;

a drive, responsive to movements of the throttle valve, for operating said at least two switches so that states of said at least two switches change between ON and OFF at respective different positions of the throttle valve;

the setting of the states of said at least two switches being such that said switches cannot be made OFF simultaneously, over the entire range of the movement of the throttle vale;

voltage generators separately connected to said at least two switches for generating voltage signals having a level which is one of High and Low in accordance with the state of each respective at least two switches;

a connector connecting the voltage generators with said at least two switches, and;

means for detecting a malfunction by determining whether voltage levels at all of the voltage generators correspond to a level obtained when both switches are OFF.

8. A fail-safe system according to claim 7, wherein the setting of the voltage generators is such that the voltage level becomes Low when the respective switch is made OFF.

9. A fail safe system according to claim 7, wherein the setting of the voltage generators is such that the voltage level becomes High when the respective switch is made OFF.

* * * * *

UNITED STATES PATENT AND TRADEMARK OFFICE
CERTIFICATE OF CORRECTION

PATENT NO. : 4,989,451

DATED : February 5, 1991

INVENTOR(S) : Masaki Ogawa et al

It is certified that error appears in the above-identified patent and that said Letters Patent is hereby corrected as shown below:

| Column | Line | |
|---|---|---|
| 2 | 11 | Before "internal" change "a" to --an--. |
| 6 | 22 | After "5V" insert --is--. |
| 6 | 45 | Change "53-2" to --53-3--. |
| 6 | 59 | Change"switches" to --switch--. |
| 7 | 12 | Before "normal" insert --a--. |
| 7 | 35 | Change "an" to --a--. |
| 7 | 44 | After "throttle" delete "is". |
| 7 | 53 | After "and" change "3" to --53-3--. |
| 7 | 63 | Change "idel" to --idle--. |
| 8 | 8 | Change "leans" to --lean--. |
| 8 | 42 | Change "and" to --at--. |
| 8 | 44 | After "is" delete ".". |
| 9 | 6 | Change "connecter" to --connector--. |
| 10 | 9 | Change "fist" to --first--. |
| 10 | 45 | Change "vale" to --valve--. |

UNITED STATES PATENT AND TRADEMARK OFFICE
CERTIFICATE OF CORRECTION

PATENT NO. : 4,989,451

DATED : February 5, 1991

INVENTOR(S) : Masaki Ogawa et al

It is certified that error appears in the above-identified patent and that said Letters Patent is hereby corrected as shown below:

| Column | Line | |
|---|---|---|
| 10 | 61 | Change "fail safe" to -- fail-safe --. |

Signed and Sealed this

Twenty-eighth Day of July, 1992

*Attest:*

DOUGLAS B. COMER

*Attesting Officer* *Acting Commissioner of Patents and Trademarks*